Jan. 28, 1964 M. R. CLELAND ETAL 3,119,971
POWER OSCILLATOR WITH REMOTE TANK
Filed Aug. 15, 1960 2 Sheets-Sheet 2

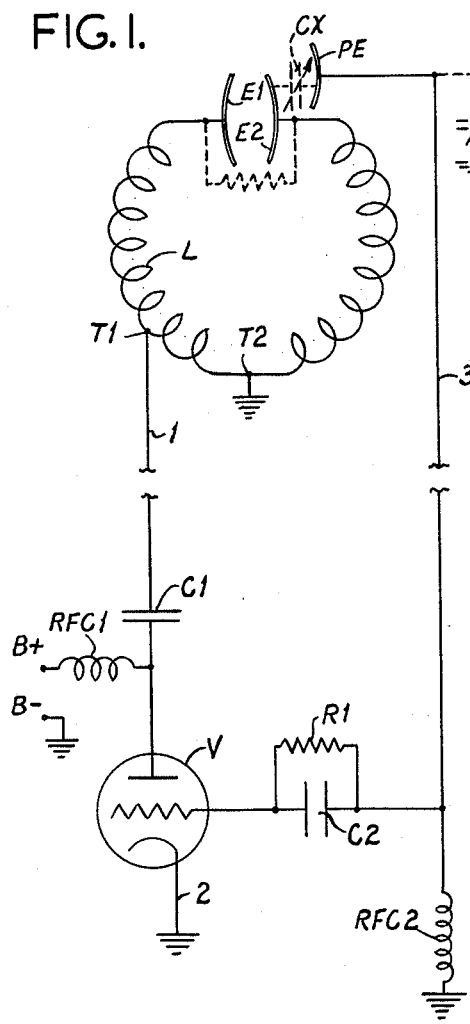
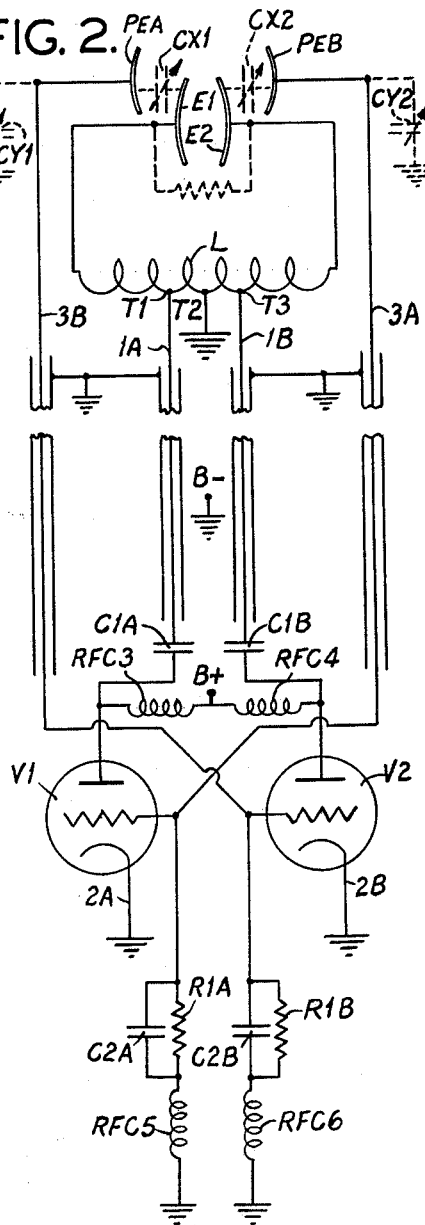

Marshall R. Cleland,
Howard F. Malone,
Inventors.
Koenig and Pope,
Attorneys.

3,119,971
POWER OSCILLATOR WITH REMOTE TANK
Marshall R. Cleland, Huntington Station, and Howard F. Malone, Massapequa Park, N.Y., assignors to Radiation Dynamics, Inc., Westbury, N.Y., a corporation of New York
Filed Aug. 15, 1960, Ser. No. 49,773
8 Claims. (Cl. 331—62)

This invention relates to power transfer apparatus and more particularly to apparatus for supplying high-voltage, high-frequency A.C. power to a load located at a substantial distance from an electrical power source.

Among the several objects of the invention may be noted the provision of power transfer apparatus that will efficiently supply a high-voltage, high-frequency A.C. potential to a point remote from an electrical power source; apparatus of the class described which operates from a relatively low-potential D.C. power source and supplies high-potential, high-frequency A.C. power to a capacitive load at a remote position; the provision of such apparatus in which the use of capacitive reactors is avoided, thereby eliminating power loss and undesirable heating of the dielectric of such capacitors; the provision of power transfer apparatus which has improved stability and in which the possibility of parasitic oscillation at spurious frequencies is eliminated; the provision of apparatus of the class described which has improved frequency stability and voltage regulation with regard to load variations; and the provision of such apparatus in which the length of the conductors through which high-frequency A.C. power is transferred is not critical and there is low transfer loss. Other objects and features will be in part apparent and in part pointed out hereinafter.

The invention accordingly comprises the constructions hereinafter described, the scope of the invention being indicated in the following claims.

Figure 3:
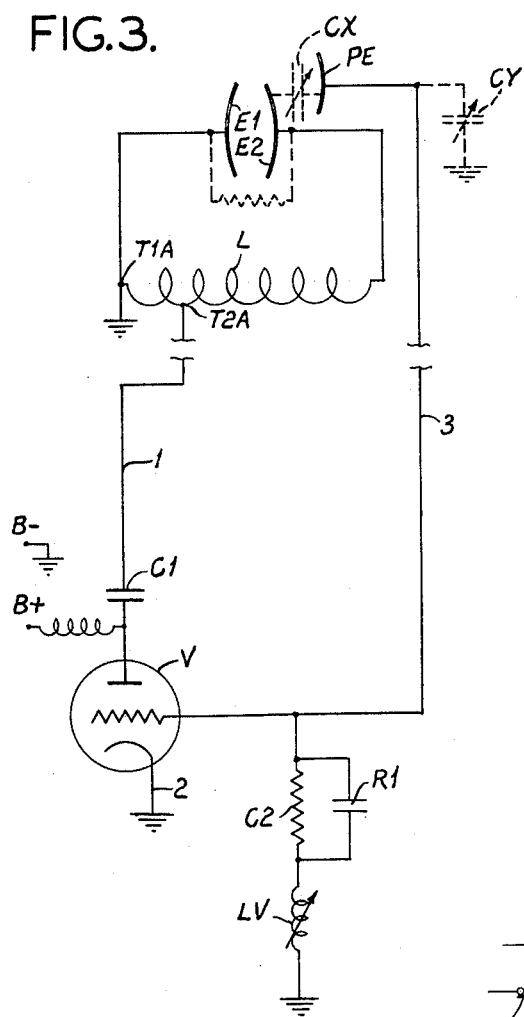
Figure 4:
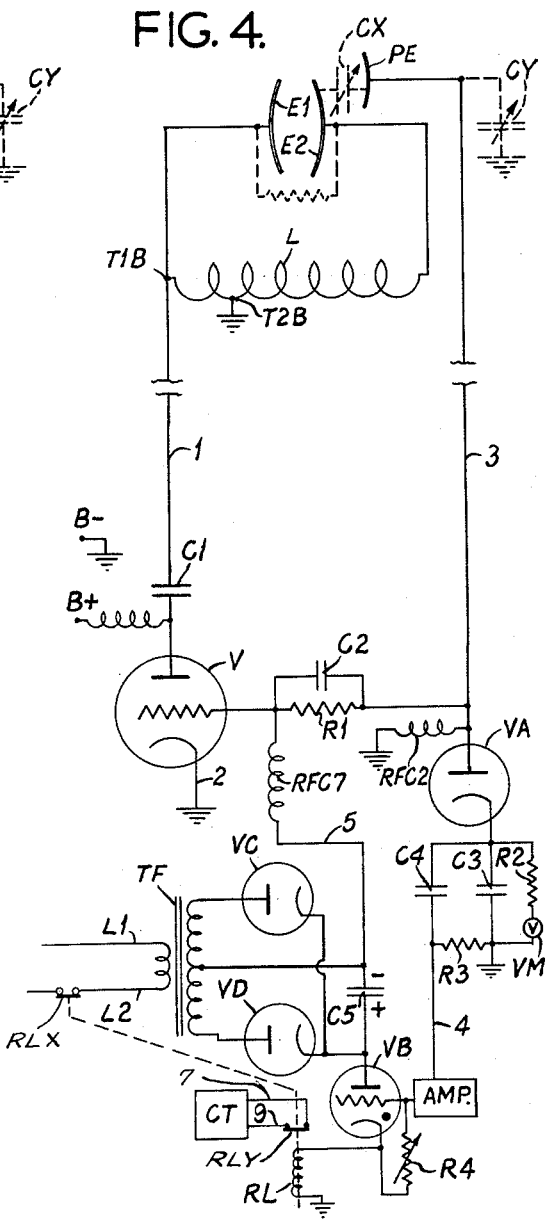

In the accompanying drawings, in which several of the various embodiments of the invention are illustrated, FIGS. 1–3 are circuit diagrams illustrating three different embodiments of the present invention; and, FIG. 4 is a circuit diagram of still another embodiment of the present invention which includes a protective circuit for the electronic transducers.

Corresponding reference characters indicate corresponding parts throughout the several views of the drawings.

Frequently, it is necessary to supply high-potential high-frequency A.C. power to a load at a distance remote from the power source. An example of this is the energization of voltage multiplication apparatus such as that disclosed and claimed in coassigned U.S. Patent 2,875,394 granted February 24, 1959, in which two spaced metallic electrodes must be supplied with A.C. power at potentials in the order of 50–300 kv. at frequencies in the range of 20–300 kc. These metallic electrodes are an integral part of apparatus which generates D.C. potentials in the order of several megavolts, and insulation requirements are such that the electrodes and associated components of the voltage multiplication apparatus are preferably sealed inside a heavy metal container, either evacuated or pressurized with some insulating gas. The efficient supplying of such high-frequency, high-potential A.C. power at levels in the order of 10 kw. or so to the metallic electrodes presents a number of serious problems. The sharply restricted spatial accommodations within the container and the difficulty of dissipating from the heavy sealed metal container the heat generated by conventional high-frequency A.C. generators such as oscillators, etc., make it desirable to generate the A.C. at a substantial distance from the sealed container and to transfer the A.C. to the enclosed metallic electrodes from a remote power source.

In accordance with the present invention, apparatus is now provided which supplies these requirements and overcomes the aforesaid difficulties. By connecting the capacitive load constituted by said electrodes to the opposite ends of an inductor and connecting first and second elements of an electronic transducer, such as vacuum tubes or transistors, to first and second tap terminals of the inductor, and connecting a control element of the transducer to a probe element which is positioned adjacent one of the metallic electrodes, an oscillatory circuit is established which will resonate at a frequency determined by the L and C parameters of the inductor and capacitive load. An A.C. potential is thereby developed across the metallic electrodes which greatly exceeds the potential of the D.C. power source used to energize the transducer. Optionally a protective circuit for the electronic transducers and the capacitive load is provided.

Referring now to the drawings, and more particularly to FIG. 1, two opposed metallic electrodes, indicated at reference characters E1 and E2, constitute a capacitive load as is described in detail in the aforesaid patent. An inductor L, having its opposite ends connected to these electrodes, includes two tap terminals T1 and T2 spaced apart a minor portion of its length. The former terminal is connected by means of a conductor 1 to a first element or anode of an electronic transducer, a vacuum tube V. The other tap terminal T2 is interconnected by means of a common ground and conductor 2 to a second element, the cathode, of tube V. Positioned adjacent but spaced away from E2 is a probe electrode PE interconnected by a conductor 3 to a third element, the control grid, of tube V. A source of D.C. power, indicated at B+ and B− is connected, via a radio frequency choke RFC1, in shunt across the anode-cathode circuit of V. A blocking condenser C1, a grid leak biasing unit (constituted by a capacitor C2 parallel-connected with a resistor R1), and a second radio frequency choke RFC2 (which establishes a D.C. grid current path), comprise the other components of this first embodiment of our invention. The cathode of V may be indirectly heated by a filament (not shown) or may be directly heated by any of the customary arrangements well-known to those skilled in the art. For simplicity, and following conventional practices, the cathode of V is shown as illustrated without filament transformers, center-taps, etc.

Upon applying the D.C. potential across the anode-cathode circuit of V, oscillatory currents are caused to flow in the L-C circuit constituted by L and the capacitive load E1—E2, and at a resonant frequency (e.g., in the order of 20–300 kc.) which is a function of the inductance and capacitance parameters of inductor and capacitive load. R.F. energy (out of phase with that at the anode of V) is capacitively coupled from E2 to PE and fed back via the R1—C2 grid leak to the control grid of V to sustain the oscillation. It will be noted that two capacitances, indicated at CX and CY, which in effect constitute a capacitance divider, are established between E2 and ground. By moving PE closer to E2 the capacitance CX is increased and capacitance CY is decreased. Thus the amplitude of the grid drive signal impressed on the control grid is controlled by varying the physical spacing between PE and E2.

Assuming that a D.C. potential, in the order of 3000–10,000 v., is connected at B+ and B−, an A.C. potential of somewhat smaller amplitude will be developed across the minor portion of inductor L between T1 and T2. Depending on the ratio of this minor portion of inductor turns to the total turns, e.g. 1:15, a multiplied potential which is a function of this turns ratio is developed across the entire inductor L. Thus, if an A.C. potential in the order of 10,000 v. is developed across T1—T2, an A.C. potential of about 150,000 v. is developed across E1—E2.

The circulating current in this resonant circuit is quite high, and at high values of Q (e.g., several hundred and higher) this current level will be many times higher than the D.C. plate current of tube V. No capacitive reactors are present in this resonant circuit, other than the capacitive load itself, and therefore the substantial power loss and heat generation which would result from the flow of these high circulatory currents through the dielectric of capacitors, is avoided. The frequency of operation and output voltage are quite stable and not substantially affected by variations in the load. The lengths of the conductors 1 and the common ground return interconnecting T2 to conductor 2 may be quite long inasmuch as the current levels in these lines are low and their lengths do not critically affect the parameters of the L-C tank circuit, and in fact their lengths are limited only by transmission time considerations. Any tendency for instability and parasitic oscillation at spurious frequencies is avoided because of the probe electrode PE feedback path, i.e., only the high amplitude or potential resonant frequency energy is effectively coupled via probe electrode PE and conductor 3 to the transducer control grid. The potential of any incipient parasitic oscillations is too low to be effectively coupled by PE and conductor 3 to the control grid.

The FIG. 2 embodiment differs from that of FIG. 1 principally in the employment of two vacuum tube transducers V1 and V2 connected in a push-pull configuration with inductor L; the use of two probe electrodes PEA and PEB; and the presence of a third tap terminal T3 on inductor L. The two probe electrodes PEA and PEB are positioned respectively adjacent the metallic electrodes E1 and E2 to capacitively couple (by means of the interelectrode capacitances CX1 and CX2) R.F. energy from these electrodes to the control grids of V2 and V1, respectively, via conductors 3B and 3A, which are illustrated as coaxial cables. T2, as in FIG. 1, is connected by the common ground connection and conductors 2A and 2B to the cathodes of V1 and V2. The anodes of V1 and V2 are respectively interconnected by coaxial cable conductors 1A and 1B to the inductor tap terminals T1 and T3. Plate blocking condensers C1A and C1B prevent application of D.C. from power supply B+, B− to inductor L, while R.F. chokes RFC3 and RFC4 block the flow of R.F. currents through the D.C. power source. The grid bias and D.C. grid return circuits utilizing C2A—R1A, C2B—R1B, and R.F. chokes RFC5 and RFC6 are essentially the same as shown in FIG. 1. The operation is also essentially identical to that of the FIG. 1 embodiment except that as in any push-pull oscillator arrangement the tubes conduct on opposite half cycles. The grid drive or excitation for V2 is varied by physically adjusting the position of PEA relative to E1, thereby changing the ratio of capacitances CX1 and CY1. V1's grid excitation is likewise controlled by adjustment of PEB which similarly affects the capacitance ratios of CX2 and CY2.

Another single-ended embodiment similar to that of FIG. 1 is illustrated in FIG. 3, which differs from the former in the positioning of the tap terminals and the grid bias components. In FIG. 3 a first tap terminal, T1A, actually constitutes one end connection of inductor L and is grounded, while a second tap terminal, T2A, is not a center tap but is positioned off center as indicated. The grid leak R1—C2 is connected in series with a variable inductor LV between ground and the control grid of V. LV functions to reverse the phase of the signal to the control grid picked up by probe electrode PE. Operation of this FIG. 3 embodiment is similar to that of the apparatus described previously.

Referring now to FIG. 4, power transfer apparatus is illustrated which includes a protective circuit for the transducer and the capacitive load to prevent damage in the event of high voltage sparking in the components of the voltage multiplication apparatus which may constitute the capacitive load. The circuitry of the inductor L and transducer V is quite similar to that described above and shown in FIGS. 1 and 3, except that a first tap terminal T1B constitutes one end of inductor L while a second tap terminal T2B is connected off center on L and is grounded. The protective circuit components include a diode VA connected from conductor 3 to ground via a meter resistor R2 and a voltmeter VM. A capacitor C3 is also connected from the cathode of VA to ground, as is an RC circuit constituted by capacitor C4 and a resistor R3. A conductor 4, connected at the junction of C4 and R3, supplies a signal to the input terminal of an amplifier AMP, the output of which is applied across a variable resistor R4 connected between the grid and cathode of a thyratron tube VB. The anode of VB is connected by a conductor 5, a filter capacitor C5 and an R.F. choke RFC7 to the control grid of V. A D.C. voltage is applied across C5 by means of a full-wave rectifier constituted by diodes VC and VD and the transformer TF, energized from any convenient A.C. power source as indicated at L1, L2. The cathode of VB is connected to ground via a relay RL having normally closed contacts RLX and RLY. Contacts RLX are in series with the A.C. input to the rectifiers VC and VD and thus turn off the grid blocking voltage, allowing the oscillator to restart automatically after the discharge of capacitor C5. Contacts RLY are connected by wires 7 and 9 to a conventional counting circuit CT whereby upon repeated operation of the relay within a predetermined time the A.C. power source energizing the D.C. power source for transducer V is deactuated.

The operation of the FIG. 4 power transfer apparatus corresponds to that described previously in regard to the other embodiments. However, the protective circuitry incorporated herein will detect transients in the amplitude of the grid drive signal from PE to the grid of V. The RC circuit (R3—C4) charges off the D.C. potential developed across C3, which is a function of the rectified R.F. grid-cathode potential of V. RC is responsive to any rapid or transient changes in this potential such as would be caused by sparking in the voltage multiplication apparatus energized by E1 and E2. An electrical signal produced across R3 is amplified to AMP and if this signal is above a predetermined value thyratron VB will be triggered into conduction. Conduction of VB completes a D.C. path via wire 5 between ground and the grid of V thereby applying the D.C. potential of C5 to the grid. As the polarity of C5 is as shown, this potential will bias V to cut-off and render it non-conductive. If the sparking persists the counting circuit CT will deenergize the D.C. power source for the transducer. The sensitivity of this protective circuit may be varied by adjustment of R4.

It is to be understood that transducers such as transistors having collector, base and emitter elements are equivalents for the purposes of this invention, and that the D.C. power source as indicated at B+, B− could be connected in series with the anode-cathode conductive circuit of the transducer as well as in shunt. Also, it is to be noted that inductors of various configurations including toroidal may be used.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Apparatus for supplying high-voltage high frequency A.C. power to capacitive load constituted by first and second metallic electrodes and located at a remote position relative to an electronic transducer, comprising an inductor positioned closely adjacent said capacitive load and having its opposite ends respectively connected to said metallic electrodes, said inductor having first and second tap terminals spaced apart a minor portion of the length of the inductor, said electronic transducer having a conductive circuit including first and second elements and a control element adapted to control the conductivity of said conductive circuit, a first conductor interconnecting said first tap terminal and said first transducer element, a second conductor interconnecting said second tap terminal and said second transducer element, a probe electrode positioned adjacent but spaced away from said second electrode and interconnected by a third conductor to said transducer control element, and a source of D.C. power adapted to establish a D.C. potential of a first predetermined value between said first and second transducer elements, whereby oscillatory currents will flow in the L-C circuit constituted by said inductor and capacitive load and the A.C. potential developed across said capacitive load greatly exceeds said first potential value and the oscillatory current is maintained by a signal capacitively coupled from said second electrode via said probe electrode to said transducer control element.

2. Apparatus as set forth in claim 1 in which said electronic transducer comprises a vacuum tube.

3. Apparatus as set forth in claim 1 in which said first tap terminal is constituted by the end of the inductor connected to said first metallic electrode.

4. Apparatus as set forth in claim 1 in which said second tap terminal is constituted by the center tap of the inductor.

5. Apparatus as set forth in claim 1 in which the capacitive coupling between the probe electrode and said second metallic electrode is variable whereby the energy capacitively coupled by the probe from the metallic electrode to the transducer control element may be adjusted.

6. Apparatus as set forth in claim 1 in which the ratio of the total number of turns of the inductor to the number of inductor turns between the tap terminals is in the order of 15:1.

7. Apparatus as set forth in claim 1 which further includes a protective circuit comprising means responsive to transient variations in the amplitude of the R.F. potential of said probe electrode to produce an electrical signal, a second source of D.C. power connected in an electrical circuit with said control element of said transducer, and switching means connected in said circuit and responsive to said signal exceeding a predetermined value to complete said electrical circuit and apply a D.C. biasing potential to the control element of said transducer to bias the said transducer to cut-off.

8. Apparatus for supplying high-voltage high-frequency A.C. power to a capacitive load constituted by first and second metallic electrodes and located at a remote position relative to a pair of electronic transducers, comprising an inductor positioned closely adjacent said capacitive load and having its opposite ends respectively connected to said metallic electrodes, said inductor having first and second tap terminals spaced apart a minor portion of the length of the inductor, a third tap terminal connected to said inductor at a position intermediate said first and second terminals, each of said electronic transducers having a conductive circuit including first and second elements and a control element adapted to control the conductivity of said conductive circuit, a first conductor interconnecting said first tap terminal and said first element of said first transducer element, a second conductor interconnecting said second tap terminal and said first element of the second transducer, a third conductor commonly interconnecting said third terminal and the second elements of said transducers, a first probe electrode positioned adjacent but spaced away from said second electrode and interconnected by a fourth conductor to said first transducer control element, a second probe electrode positioned adjacent but spaced away from said first electrode and interconnected by a fifth conductor to said second transducer control element, and a source of D.C. power adapted to establish a D.C. potential of a first predetermined value between said first and second transducer elements, whereby oscillatory currents will flow in the L-C circuit constituted by said inductor and capacitive load and the A.C. potential developed across said capacitive load greatly exceeds said first potential value and the oscillatory current is maintained by signals capacitively coupled from said metallic electrodes via said probe electrodes to said transducer control elements.

References Cited in the file of this patent

UNITED STATES PATENTS

| | | |
|---|---|---|
| 2,121,829 | Seaman et al. | June 28, 1938 |
| 2,276,995 | Milinowski | Mar. 17, 1942 |